(12) United States Patent
Choi et al.

(10) Patent No.: US 8,042,758 B2
(45) Date of Patent: Oct. 25, 2011

(54) CYLINDER IN PRETENSIONER FOR SEAT BELT RETRACTOR AND PRETENSIONER FOR SEAT BELT RETRACTOR EMPLOYING THE SAME

(75) Inventors: In-Su Choi, Gyeonggi-do (KR); Jung-Min Lee, Seoul (KR); Byung-Jin Lee, Daegu (KR); Dong-Sub Lee, Gangwon-do (KR); Sang-Hong Bai, Gangwon-do (KR); Gi-Young Bae, Gangwon-do (KR); Jong-Kag Kim, Gangwon-do (KR); Do-Shik Kim, Seoul (KR)

(73) Assignee: Autoliv Development AB, Vargarda (SE)

( * ) Notice: Subject to any disclaimer, the term of this patent is extended or adjusted under 35 U.S.C. 154(b) by 231 days.

(21) Appl. No.: 12/152,630

(22) Filed: May 14, 2008

(65) Prior Publication Data
US 2009/0134691 A1 May 28, 2009

(30) Foreign Application Priority Data

May 16, 2007 (KR) .................. 10-2007-0047791

(51) Int. Cl.
*B65H 75/48* (2006.01)
(52) U.S. Cl. ..................................... 242/374; 242/379.1
(58) Field of Classification Search .................. 242/374, 242/379.1; 280/805, 806, 807; 60/635, 636; 297/474, 475, 476, 477, 478, 480
See application file for complete search history.

(56) References Cited

U.S. PATENT DOCUMENTS

| | | | |
|---|---|---|---|
| 4,244,600 A | 1/1981 | Takada |
| 4,278,216 A | 7/1981 | Takada |
| 4,392,620 A | 7/1983 | Takada |
| 4,401,282 A | 8/1983 | Miki |
| 4,726,540 A | 2/1988 | Ches et al. |
| 5,375,787 A | 12/1994 | Fujimura et al. |
| 5,443,224 A | 8/1995 | Patterson et al. |

(Continued)

FOREIGN PATENT DOCUMENTS
JP 2003-212086 7/2003

*Primary Examiner* — Michael Mansen
*Assistant Examiner* — Juan Campos, Jr.
(74) *Attorney, Agent, or Firm* — Brinks Hofer Gilson & Lione

(57) ABSTRACT

Provided is a pretensioner for a seat belt retractor. The pretensioner for a seat belt retractor of a vehicle includes a torsion bar on which a webbing is wound; a gear member connected to the torsion bar; a base member with which the gear member is meshed and through which the torsion bar passes; a cylinder having a movement guide hole formed therein to supply a gas upon rapid deceleration of the vehicle; a piston having a rack formed at a side surface thereof in a longitudinal direction to be meshed with the gear member and moved along the movement guide hole upon supply of a gas, and; a cylindrical sealing operation part integrally formed with a bottom of the piston and projecting therefrom; and a sealing part coupled to an outer periphery of the sealing operation part to seal between the piston and an inner wall of the cylinder, wherein the base member has a hooking means for hooking the piston to a rack. Since the rack of the piston is hooked by the hooking means and assembled thereto, it is possible to form an appropriate gap (or a marginal space) between the sealing part and the straight movement guide hole.

5 Claims, 13 Drawing Sheets

U.S. PATENT DOCUMENTS

| | | |
|---|---|---|
| 5,495,994 A | 3/1996 | Rumpf et al. |
| 5,568,941 A | 10/1996 | Woydick et al. |
| 5,794,876 A * | 8/1998 | Morizane et al. ............. 242/374 |
| 5,826,813 A | 10/1998 | Hibata |
| 5,984,223 A | 11/1999 | Hiramatsu |
| 6,299,093 B1 | 10/2001 | Harte et al. |
| 6,318,662 B1 * | 11/2001 | Hori et al. ..................... 242/374 |
| 6,354,528 B1 | 3/2002 | Nagata et al. |
| 6,698,677 B1 * | 3/2004 | Happ et al. .................... 242/374 |
| 7,290,730 B2 | 11/2007 | Nagata et al. |
| 7,401,815 B2 * | 7/2008 | Clute ............................ 280/803 |
| 2005/0211816 A1 * | 9/2005 | Takamatsu et al. ........... 242/374 |

* cited by examiner

CYLINDER IN PRETENSIONER FOR SEAT BELT RETRACTOR AND PRETENSIONER FOR SEAT BELT RETRACTOR EMPLOYING THE SAME

CROSS-REFERENCE TO RELATED APPLICATION

This application claims the benefit of Korean Patent Application No. 2007-0047791, filed May 16, 2007, the disclosure of which is hereby incorporated herein by reference in its entirety.

BACKGROUND OF THE INVENTION

1. Field of the Invention

The present invention relates to a pretensioner for a seat belt retractor, and more particularly, to a pretensioner for a seat belt retractor a capable of forcedly winding a webbing on a torsion bar upon abrupt deceleration of a vehicle due to collision, and so on, to prevent the webbing from being loosened.

2. Description of the Conventional Art

A conventional seat belt retractor employs a pretensioner for forcedly winding a webbing on a torsion bar upon abrupt deceleration of a vehicle due to collision, and so on, to prevent the webbing from being loosened.

Several examples of the conventional seat belt retractor will be described below.

Conventional Art 1

Typical structure of the pretensioner is disclosed in Japanese Patent Laid-open Publication No. 2000-302012, entitled "Webbing Winding Device," which will be described in brief.

The webbing winding device includes a winding shaft to which a base end of a long strip-shaped webbing belt for restricting a passenger's body is fixed and to which force is applied in a direction winding the webbing belt, a pretensioner for rotating the winding shaft in the winding direction under a predetermined condition, a bearing means having an inner periphery into which the winding shaft is inserted on a shaft having an inner diameter larger than an outer diameter of the winding shaft, and a projection projecting from one of the inner periphery of the bearing means and the outer periphery of the winding shaft toward the other, and contacting the other at a very small area in comparison with the area of the other opposite to the one.

Conventional Art 2

In addition, Japanese Patent Laid-open Publication No. 2000-302013 discloses "Pretensioner," which will be described in brief.

The pretensioner is integrally formed with a webbing winding device for winding a webbing for restricting a passenger on a winding shaft in a layered manner to rapidly rotate the winding shaft in a webbing winding direction to a predetermined extent using a rack/pinion type drive mechanism upon rapid deceleration of a vehicle. The drive mechanism includes a piston movably disposed in a cylinder in an axial direction and having a rack bar to be moved upon rapid deceleration of the vehicle, and a pinion disposed to be meshed with a rack gear of the piston and directly connected to a shaft end of the winding shaft through the medium of a clutch connected to the winding shaft upon rapid deceleration of the vehicle.

Conventional Art 3

Further, Japanese Patent Laid-open Publication No. 2003-335217 discloses a safety belt retractor, which will be described in brief.

The safety belt retractor includes a housing having a pair of side plates, a winding shaft rotatably supported between the side plates of the housing and rotatably biased in a webbing winding direction, and a pretensioner mechanism attached to one side plate of the housing to rotate the winding shaft in the winding direction and wind the webbing upon rapid deceleration of a vehicle.

The pretensioner mechanism includes a gas generator for generating a gas, a cylinder having one end on which the gas generator is mounted and the other end installed at an outer surface of the one side plate of the housing at its one side, and a pinion gear interlocked with the winding shaft to be rotatably supported by the winding shaft.

In addition, a piston is installed at a base end to be movably accommodated in the cylinder to be driven by a gas pressure, and a rack is formed at a front end of the piston to be meshed with the pinion gear. The rack is meshed with the pinion gear depending on the compression driving of the piston to rotate the winding shaft in the winding direction.

Further, the retractor includes a cover body for forming a movement guide path of the rack disposed on an extension line of the other end of the cylinder and projecting from the other end of the cylinder, a first adhesion part installed at the one side plate of the housing to cover an opening at the other side of the cylinder in a manner adhered to the piston, and a second adhesion part installed at the cover body to cover the opening of the other side of the cylinder in a manner adhered to the piston.

Conventional Art 4

In addition, Japanese Patent Laid-open Publication No. 2004-1777 discloses a pretensioner, which will be described in brief.

The pretensioner is integrally formed with a webbing winding device for winding a webbing for restricting a passenger on a winding shaft in a layered manner to rapidly rotate the winding shaft in a webbing winding direction to a predetermined extent using a rack/pinion type drive mechanism upon rapid deceleration of a vehicle.

The drive mechanism includes a piston movably disposed in a cylinder in an axial direction and having a rack bar to be moved upon rapid deceleration of the vehicle, and a pinion disposed to be meshed with a rack gear of the piston and directly connected to a shaft end of the winding shaft through the medium of a clutch connected to the winding shaft upon rapid deceleration of the vehicle.

The pinion includes a gear part having a pinion gear meshed with the rack gear, and a clutch part integrally formed with the gear part in a concentric manner and having the clutch formed at an inner periphery thereof.

Conventional Art 5

First, Japanese Patent Registration No. 3519302 discloses a typical pretensioner structure, which will be described below in brief with reference to FIGS. 1A to 1C.

As shown, a retractor 38 of Conventional Art 5 includes a housing 12 fixed to a vehicle, and a torsion bar 14 rotatably installed at the housing 12. A webbing 16 is wound on the torsion bar 14.

In addition, the retractor 38 includes a piston-gear type pretensioner 10 for a seat belt retractor. A gear member 18 is connected to one end of the torsion bar 14. Therefore, rotation of the gear member 18 causes rotation of the torsion bar 14 to wind the webbing 16.

Further, a cylinder 20 is fixed to the housing 12. The cylinder 20 has a hollow cylindrical shape, a tip 22 of which is opened adjacent to the gear member 18.

Meanwhile, a cylindrical recess 26 is formed at a bottom surface 24 of the cylinder 20. The recess 26 has a diameter smaller than an inner diameter of the cylinder 20 such that a position of an O-ring 34 is determined depending on constitution of the bottom surface 24 and the recess 26 of the cylinder 20. In addition, a gas supply port (not shown) is formed at the recess 26 to allow supply of a gas into the cylinder 20 when the vehicle is abruptly decelerated.

Further, a substantially circular pressure receiving plate 28 is installed in the cylinder 20 to move in the cylinder 20. As a result, when a gas is supplied into the cylinder 20, the pressure receiving plate 28 moves along an arrow (direction C) of FIG. 1C.

In addition, a piston 30 is integrally formed with a surface of the pressure receiving plate 28 facing the gear member 18. A rack formed at one side of the piston 30 corresponds to the gear member 18. When the piston 30 moves with the pressure receiving plate 28 in the arrow direction C of FIG. 1C, the rack of the piston 30 is meshed with the gear member 18 to rotate the gear member 18 in a direction that the webbing 16 is wound (an arrow A of FIG. 1C).

Meanwhile, a cylindrical seal holding part 32 is integrally formed with the pressure receiving plate 28 facing the bottom surface 24 of the cylinder 20, and the O-ring 34 is disposed on an outer periphery of the seal holding part 32. The O-ring 34 has an elasticity to seal between the pressure receiving plate 28 and an inner wall 36 of the cylinder 20.

In addition, the O-ring interposed between the pressure receiving plate 28 and the bottom surface 24 of the cylinder 20 prevents the pressure receiving plate 28 from being in direct contact with the bottom surface 24 of the cylinder 20. In this state, the position of the pressure receiving plate 28 is an initial position (an initial assembly position) of the pressure receiving plate 28. Here, the seal holding part 32 is disposed in the recess 26 of the bottom surface 24 of the cylinder 20, with the O-ring 24 being in contact with the bottom surface 24 of the cylinder 20. Further, the recess 26 has a depth such that the seal holding part 32 is not in contact with a bottom surface 27 of the recess 26 even when the O-ring is elastically deformed.

Meanwhile, since the piston-gear type pretensioner for a seat belt retractor of Conventional Art 5 includes a force limiter (not shown), when the force limiter is operated, the gear member 18 is rotated in a counter-winding direction of the webbing 16 to release the webbing 16, thereby preventing a passenger from receiving a load more than a predetermined amount.

Eventually, in the case of the pretensioner of Conventional Art 5, the recess 26 having a diameter smaller than an inner diameter of the cylinder 20 is formed at the bottom surface 24 of the cylinder 24, and a step is formed between the inner wall 36 of the cylinder 20 and an inner wall of the recess 26. In addition, the O-ring 34 is disposed on the step.

Since the step narrows a space between the bottom surface of the recess 26 and a lower end of the seal holding part 32, a gas pressure provided through the gas supply port may be insufficiently transmitted to the pressure receiving plate.

In addition, according to Conventional Art 5, a portion of the cylinder adjacent to the gas support port may be weak to be readily broken on gas discharge.

Conventional Art 6

Japanese Patent Registration No. 3819189 discloses a constitution of a pretensioner, which will be described with reference to FIG. 2.

As shown, since a piston head 20 of a piston 22 of Conventional Art 6 maintains a state extended in an initial assembly position to a bottom position in which a straight section of the piston accommodating part 30 of the cylinder 24 is terminated, there is an insufficient space to be pressed by the discharged gas.

In addition, since the cylinder has a small thickness at its corners in which a gas pressure is largely applied and abruptly changes its direction, the corners of the cylinders may be damaged on gas discharge.

Conventional Art 7

Japanese Patent Registration No. 3218987 discloses a constitution of a pretensioner for a seat belt retractor, which will be described with reference to FIG. 3.

As shown, since a piston head 7 of a piston 25 of Conventional Art 7 also maintains a state extended from an initial assembly position to a bottom position in which a straight section of the piston accommodating part of the cylinder 24 is terminated, there is an insufficient space to be pressed by the discharged gas.

In addition, since the cylinder has a small thickness at its corners in which a gas pressure is largely applied and abruptly changes its direction, the corners of the cylinders may be damaged on gas discharge.

Conventional Art 8

Japanese Patent Laid-open Publication No. 1995-251710 discloses a constitution of a pretensioner for a seat belt, which will be described with reference to FIG. 4.

As shown, the pretensioner for a seat belt of Conventional Art 8 includes an ignition propulsion wadding material operated by a fuse 48 and adapted to a drive device for the seat belt pretensioner, and the drive device includes a piston 18 for performing translation movement of a piston-cylinder unit.

However, in the seat belt pretensioner of Conventional Art 8, since an end of the piston 18 is disposed on a step of an inner wall of a cylinder 16 to maintain an initial assembly state, an area on which a gas pressure is applied is reduced to decrease operation efficiency of the gas pressure against a lower end of the piston 18.

Conventional Art 9

Great Britain Patent GB1162323 discloses a constitution of a pretensioner for a seat belt, which will be described with reference to FIG. 5.

As shown, since a piston head 26 of a piston 25 of Conventional Art 9 also maintains a state extended from an initial assembly position to a substantially bottom position of the piston accommodating part of the cylinder 24, there is an insufficient space to be pressed by the discharged gas.

As described above, since the piston head of the piston is disposed at a lower end of a straight movable guide of the cylinder on initial assembly to form an insufficient space under the piston head, or a step formed at a lower end of the cylinder also narrows the space, it is difficult to sufficiently apply a predetermined gas pressure to a pressure receiving plate.

SUMMARY OF THE INVENTION

An aspect of the present invention is to provide a pretensioner for a seat belt retractor capable of applying a sufficient pressure to a pressure receiving plate to increase an upward force and increasing a strength of the cylinder against a high pressure injection gas.

An embodiment of the invention provides a pretensioner for a seat belt retractor of a vehicle including:
a torsion bar on which a webbing is wound;
a gear member connected to the torsion bar;
a base member with which the gear member is meshed and through which the torsion bar passes;

a cylinder having a movement guide hole formed therein to supply a gas upon rapid deceleration of the vehicle;

a piston having a rack formed at a side surface thereof in a longitudinal direction to be meshed with the gear member and moved along the movement guide hole upon supply of a gas, and;

a cylindrical sealing operation part integrally formed with a bottom of the piston and projecting therefrom; and a sealing part coupled to an outer periphery of the sealing operation part to seal between the piston and an inner wall of the cylinder, wherein the base member has a hooking means for hooking the piston to a rack.

In this embodiment, the sealing part may be an O-ring.

In addition, the sealing part may be a plastic coating part.

Further, the hooking means may be a position fixing piece having a shape meshed with the rack of the piston.

Furthermore, the base member may have a guide piece disposed at a position opposite to the position fixing piece with the piston interposed therebetween, and having a surface parallel to the piston.

In addition, the cylinder may have a guide cover fixed thereto to guide the piston.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF EXEMPLARY EMBODIMENTS

Figure 1A:
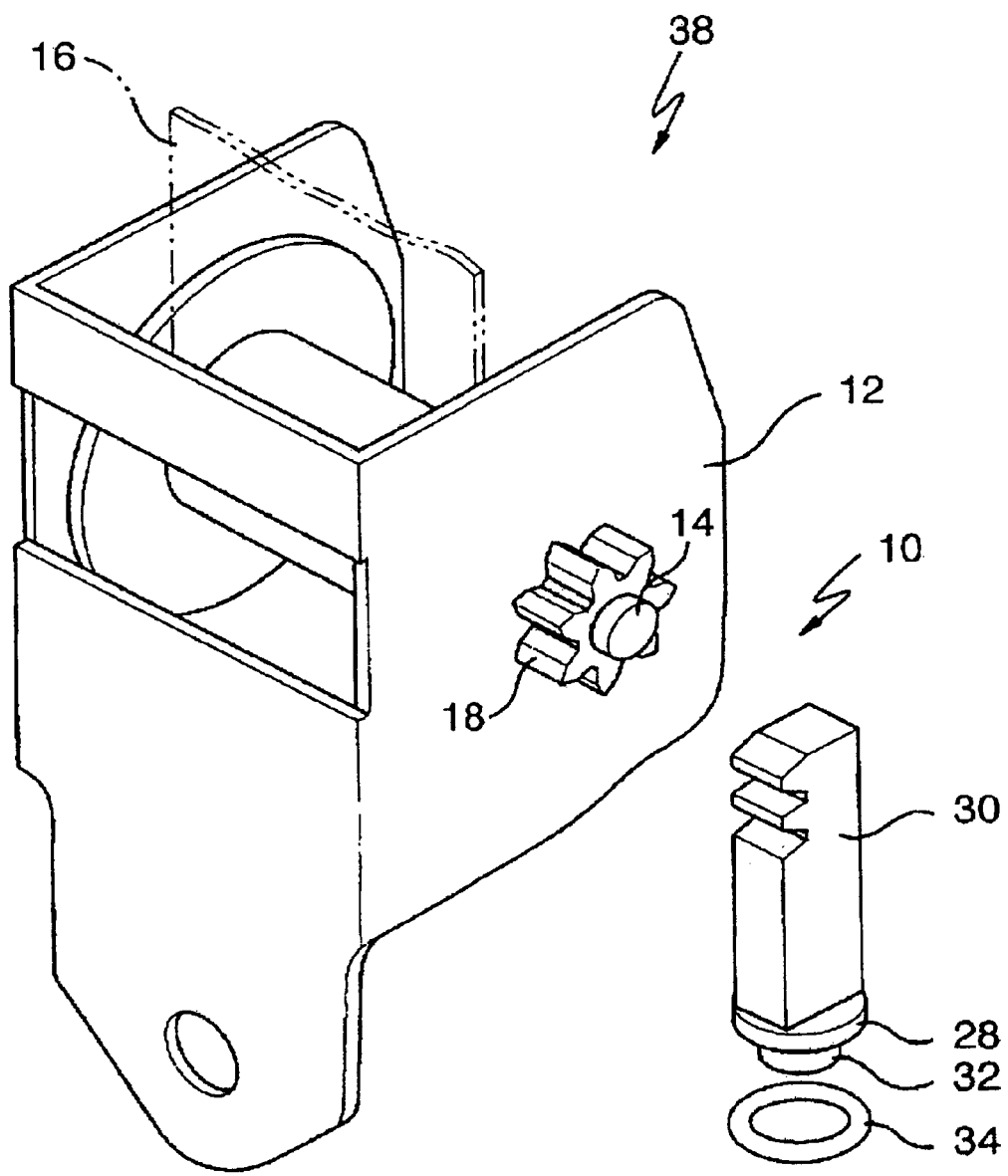
FIGS. 1A to 1C are views showing a constitution of a pretensioner for a seat belt retractor of Conventional Art 5.
Figure 1B:
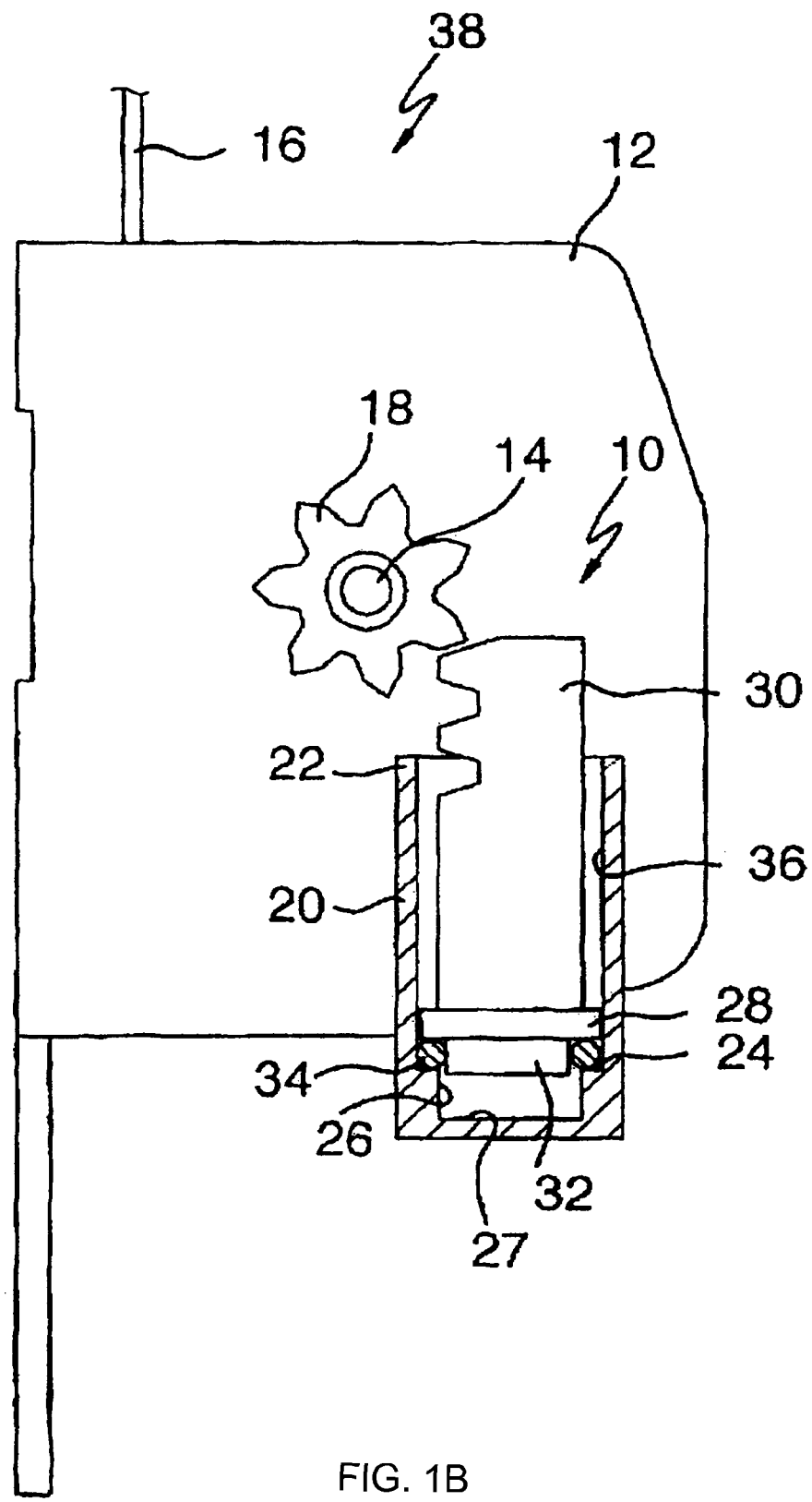
Figure 1C:
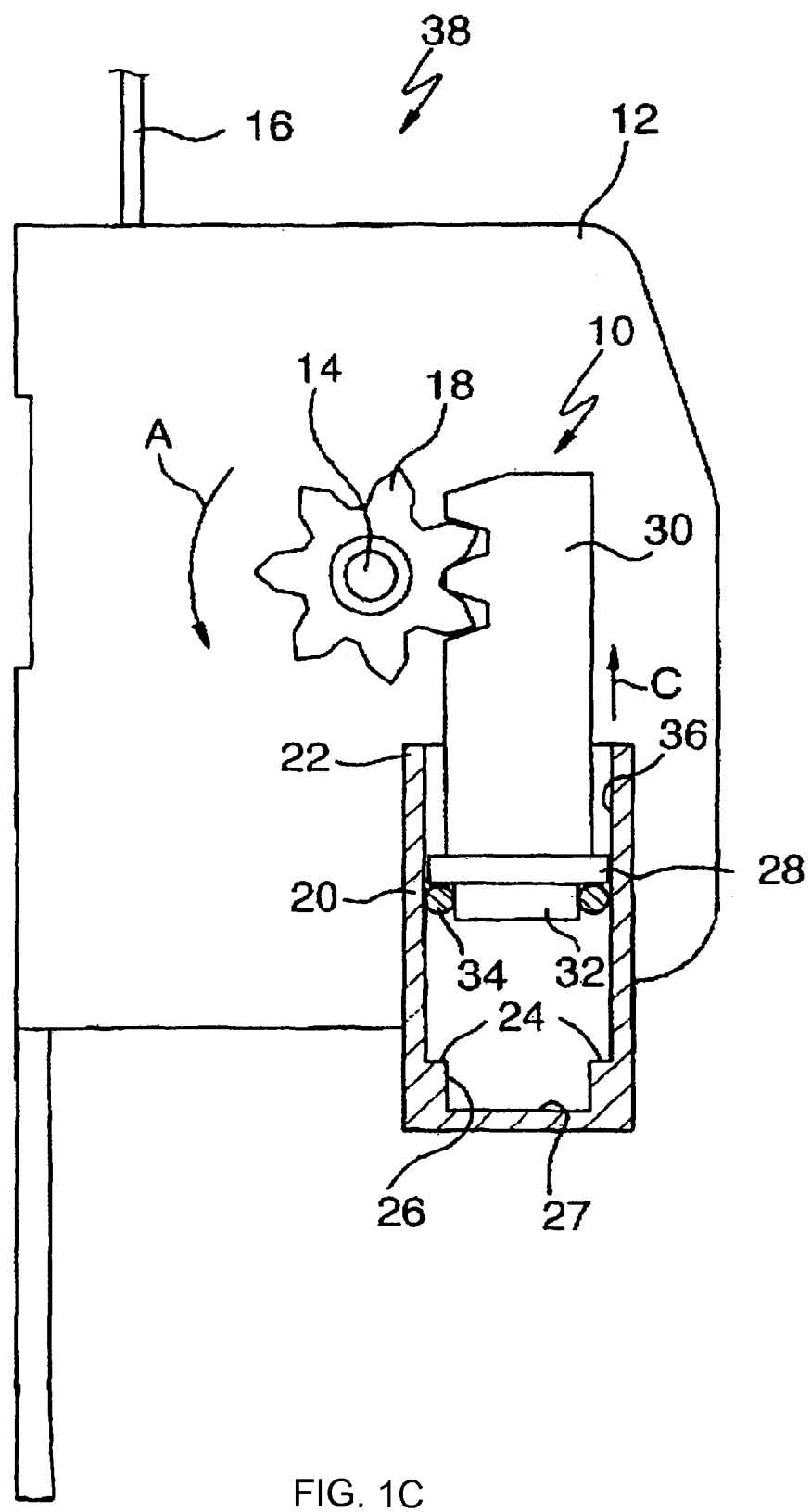
Figure 2:
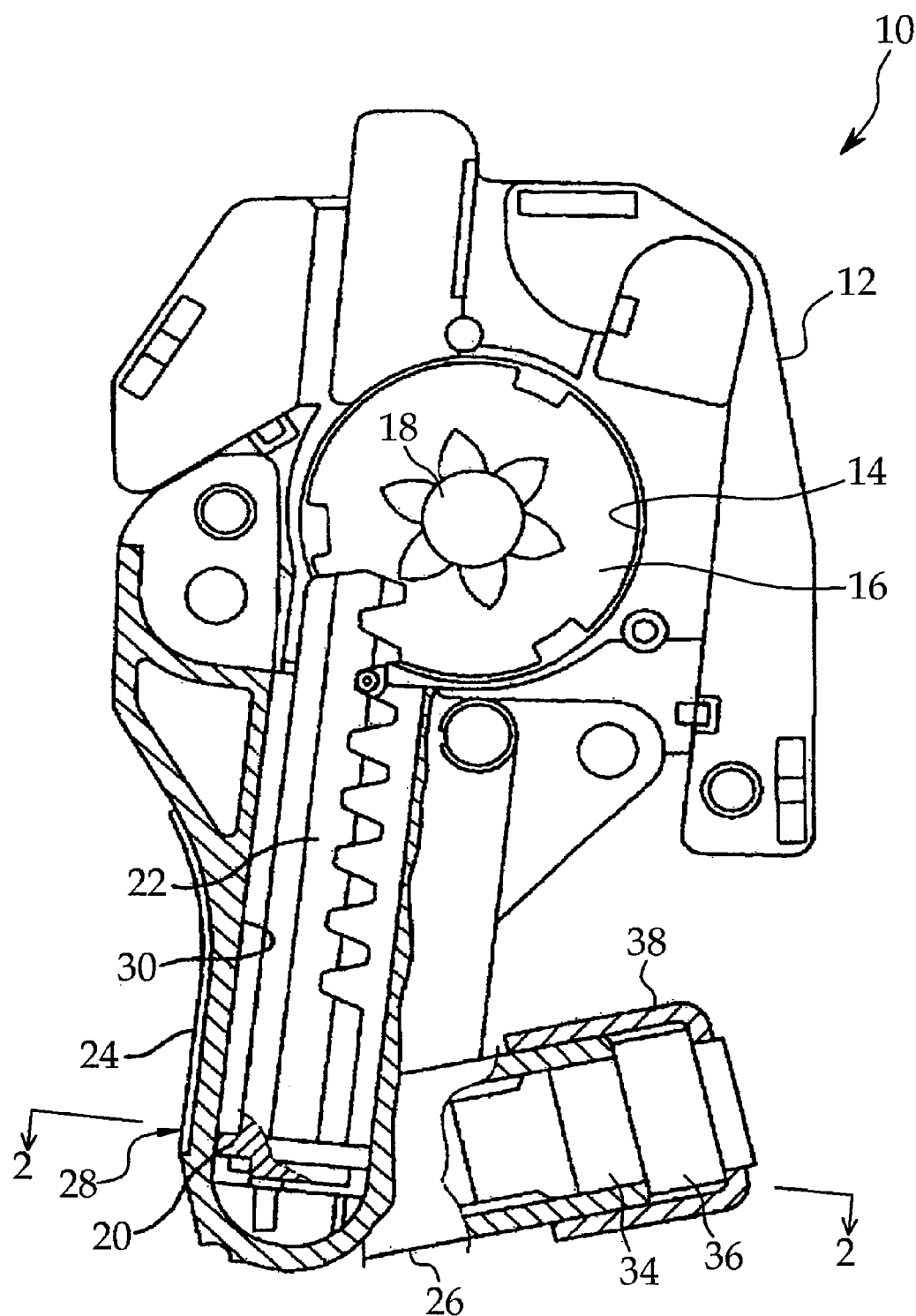
FIG. 2 is a cross-sectional view showing a constitution of a pretensioner for a seat belt retractor of Conventional Art 6.
Figure 3:
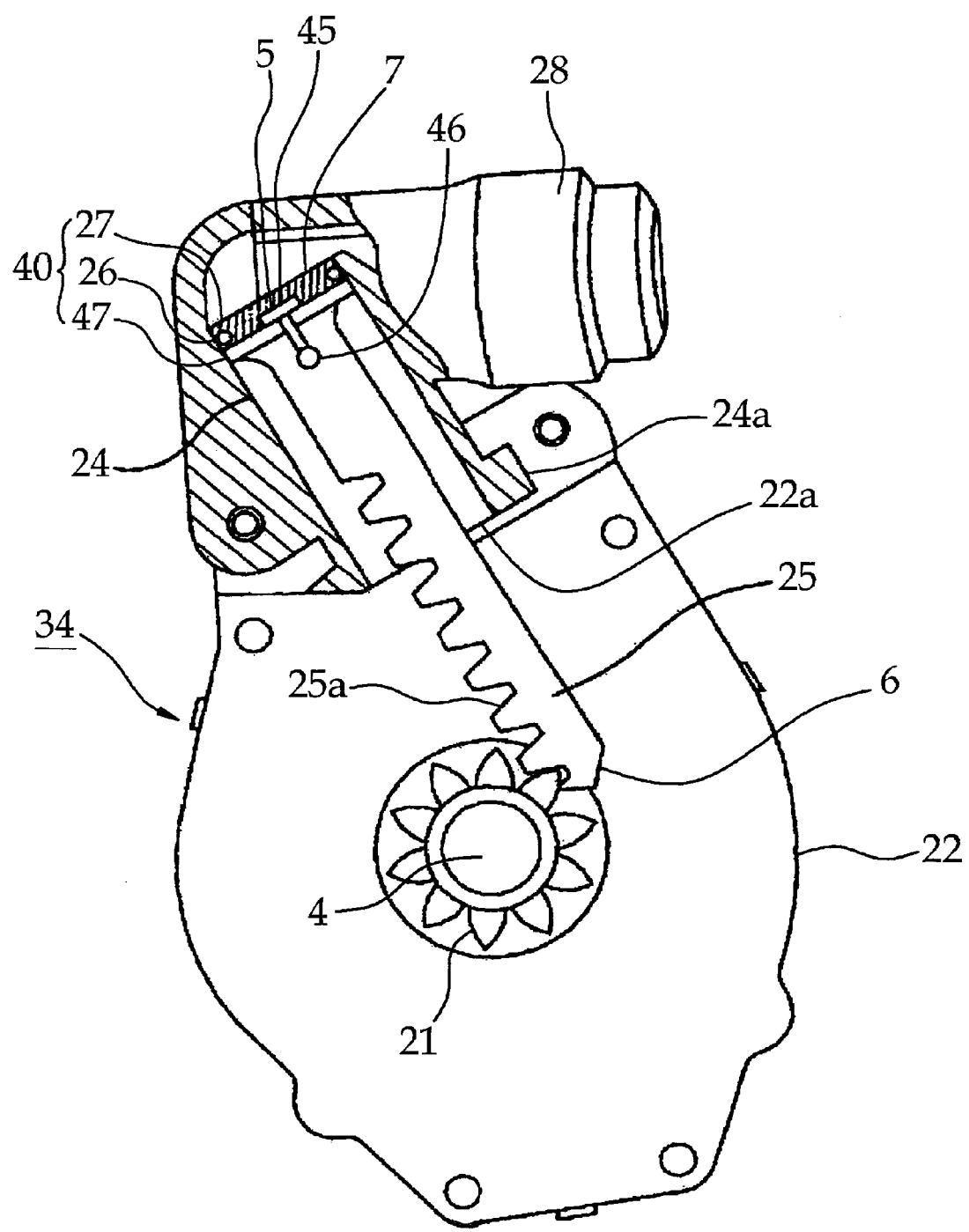
FIG. 3 is a cross-sectional view showing a constitution of a pretensioner for a seat belt retractor of Conventional Art 7.
Figure 4:
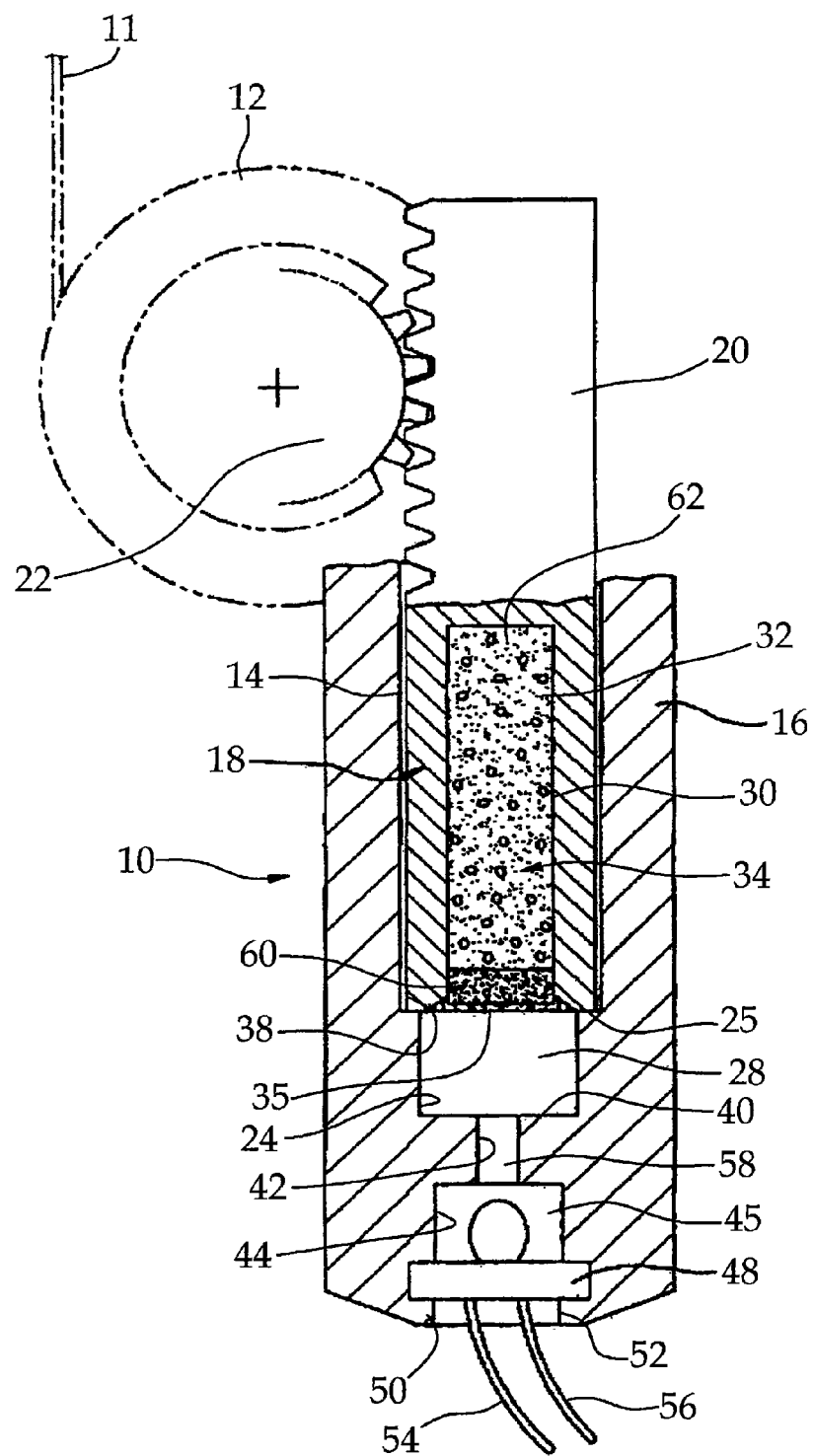
FIG. 4 is a cross-sectional view showing a constitution of a pretensioner for a seat belt retractor of Conventional Art 8.
Figure 5:
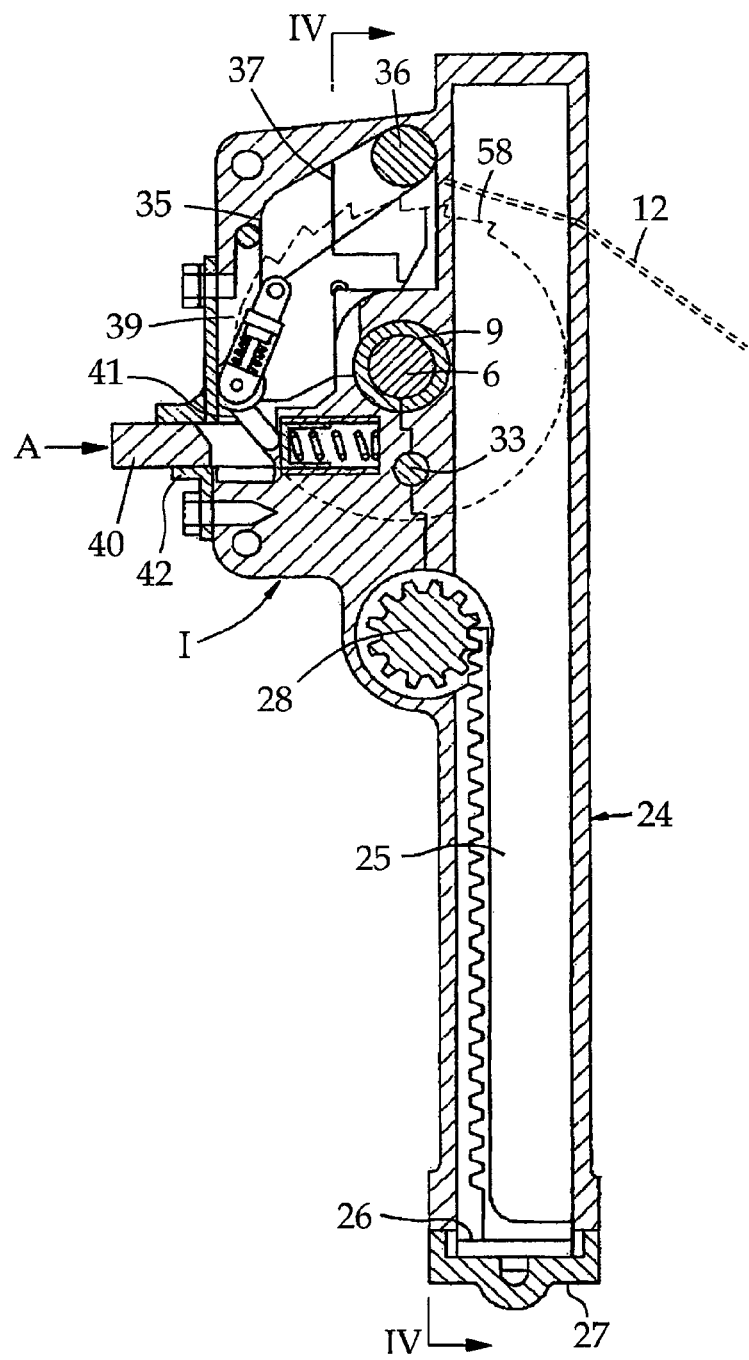
FIG. 5 is a cross-sectional view showing a constitution of a pretensioner for a seat belt retractor of Conventional Art 9.
Figure 6A:
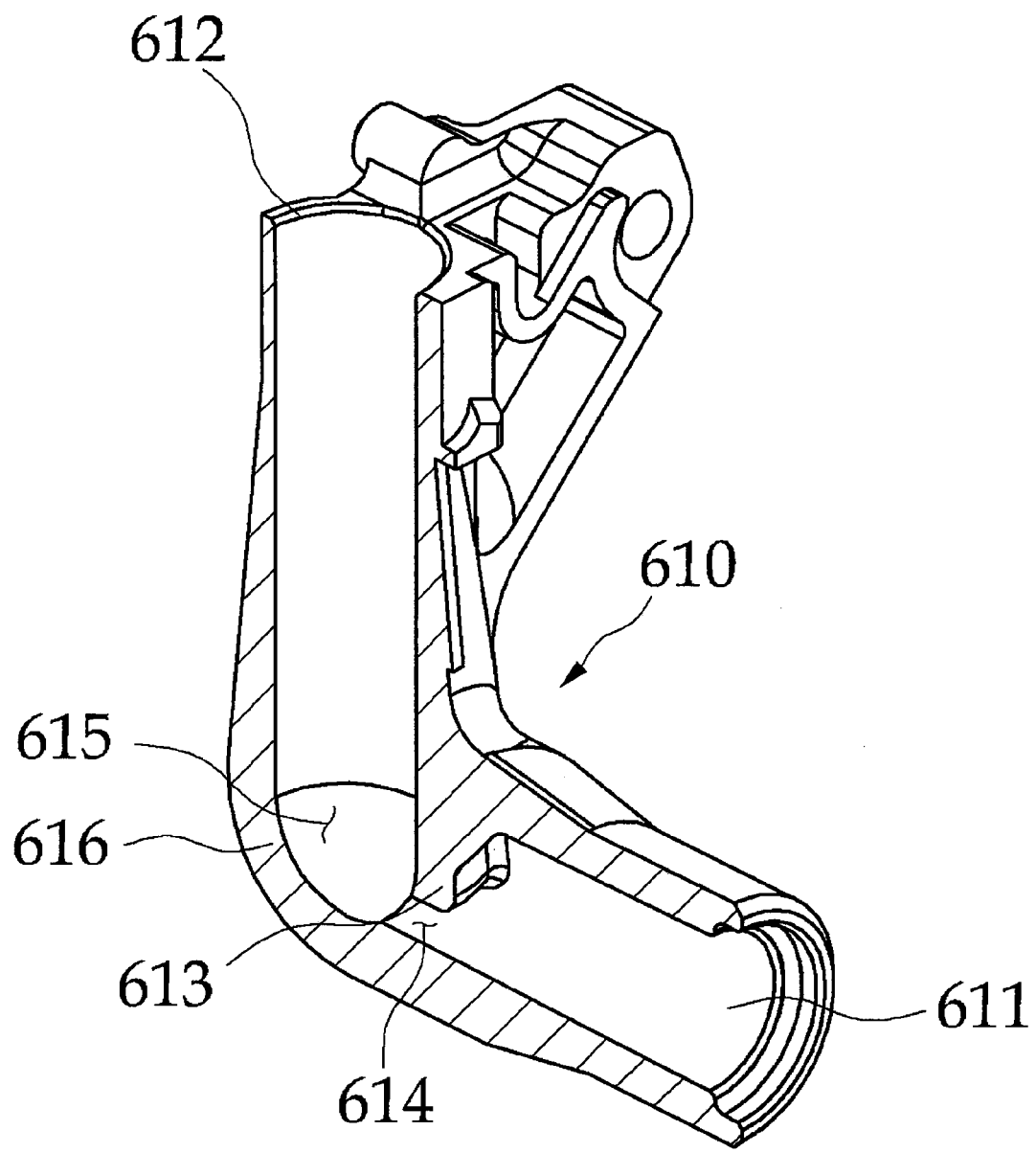
FIG. 6A is a partially cut perspective view of a cylinder in a pretensioner for a seat belt retractor in accordance with an exemplary embodiment of the present invention.
Figure 6B:
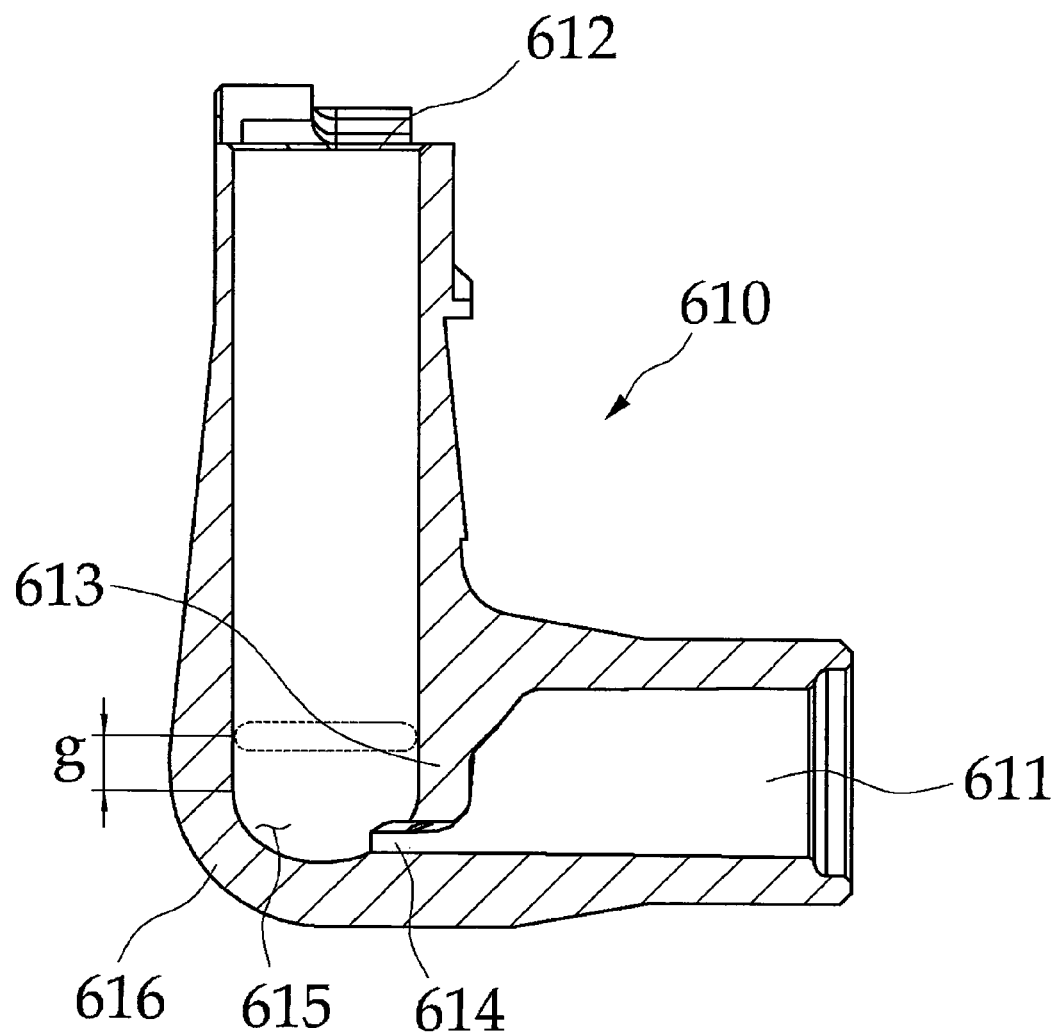
FIG. 6B is a longitudinal perspective view of the cylinder in a pretensioner for a seat belt retractor in accordance with an exemplary embodiment of the present invention.
Figure 7A:
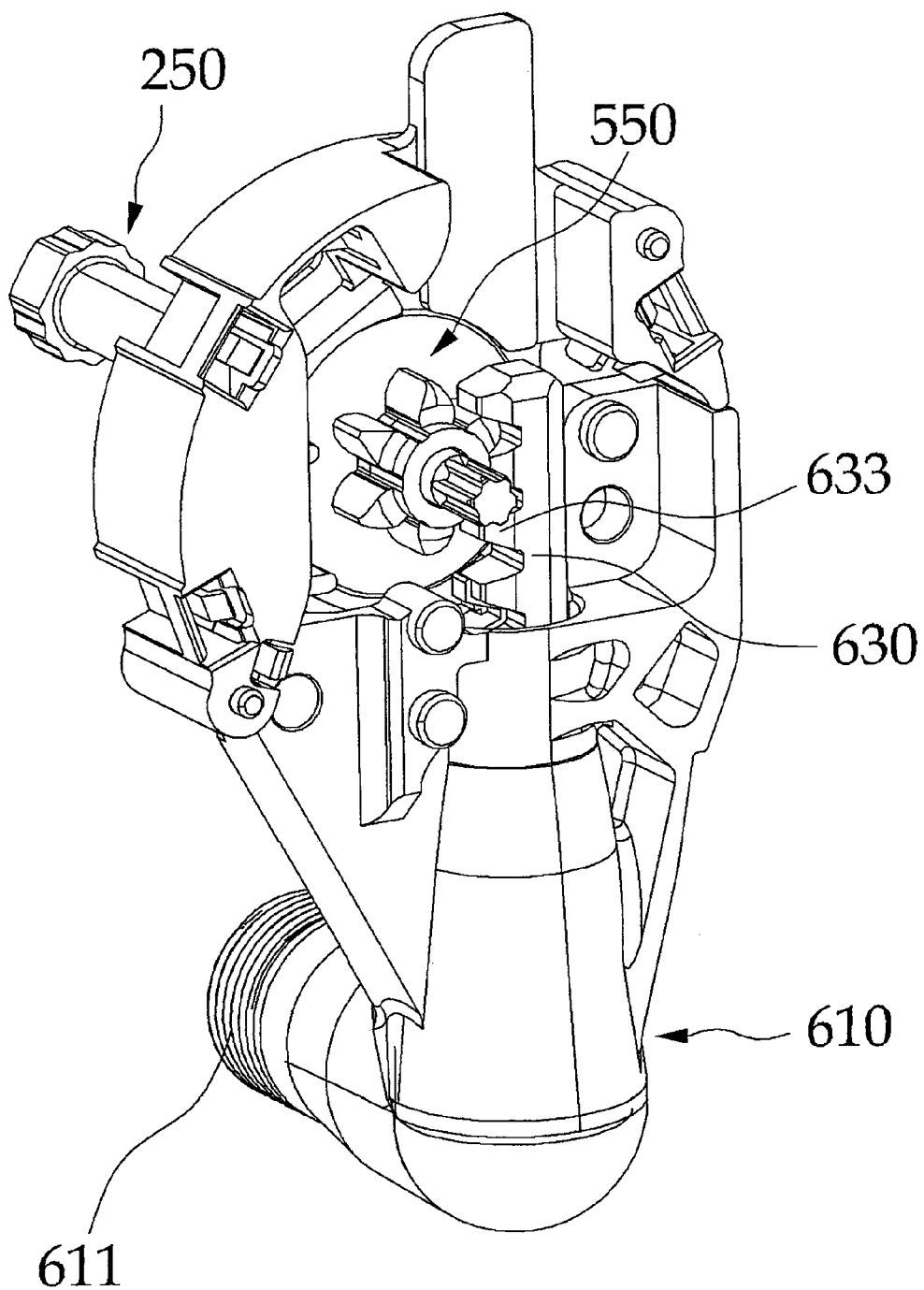
FIG. 7A is a perspective view of a pretensioner for a seat belt retractor, in which a cylinder in accordance with an exemplary embodiment of the present invention is installed.
Figure 7B:
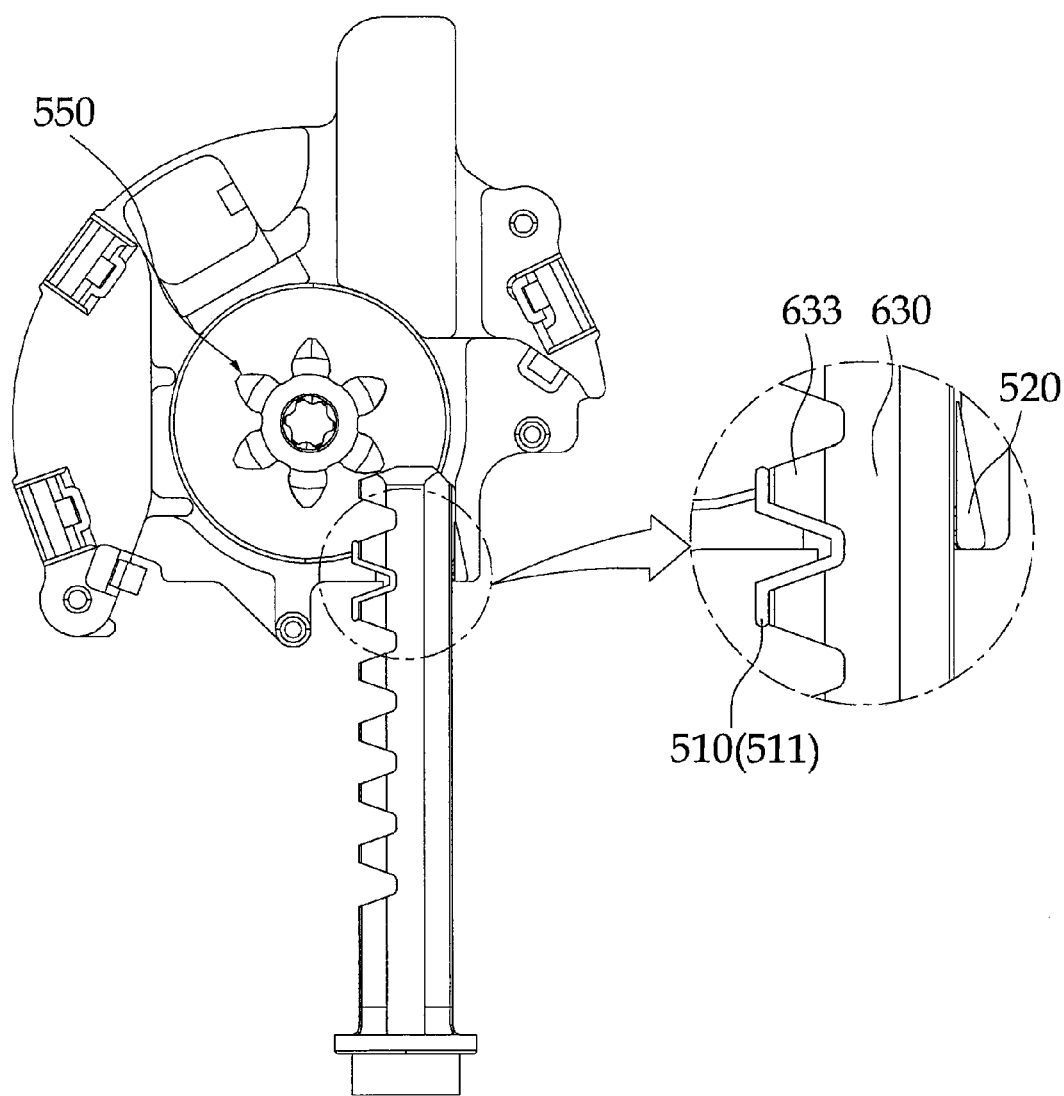
FIG. 7B is a side view of the pretensioner for a seat belt retractor, from which the cylinder of FIG. 7A is removed.
Figure 8:
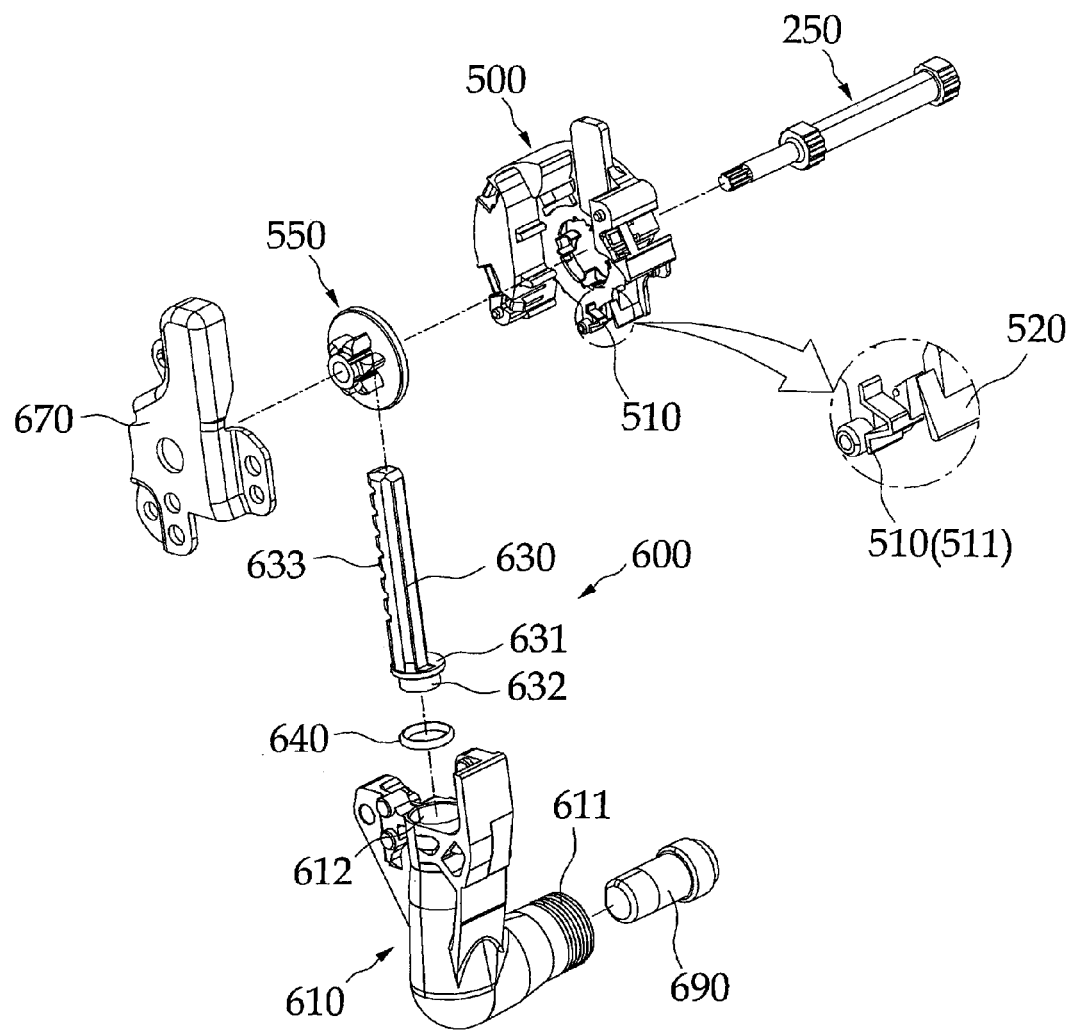
FIG. 8 is an exploded perspective view of FIG. 7A.

Hereinafter, exemplary embodiments of the present invention will be described with reference to the accompanying drawings.

As shown, a cylinder 610 in a pretensioner for a seat belt retractor has an L-shaped hollow shape when seen from a side view. That is, a substantially L-shaped pipe is provided.

The L-shaped cylinder 610 has one hole acting as a gas supply port 611 connected to an inflator 690, and the other hole acting as a straight movement guide hole 612 through which a piston 630 reciprocates.

In accordance with the present invention, the straight movement guide hole 612 vertically extends, and a partially spherical rotation space 615 is formed at a lower end of the movement guide hole 612 to be in communication with the gas supply port 611.

Upon assembly of the pretensioner, the sealing part 640 is positioned at a location in which the lower end of the movement guide hole 612 meets the partially spherical rotation space 615, and a rack 633 of the piston 630 is appropriately meshed with a gear member 550.

However, when the rack 633 of the piston 630 is coupled to a hooking means 510 in a state that the rack 633 is raised by one pitch, a gap (or a marginal space) corresponding to the pitch can be formed between the sealing part 640 and the movement guide hole 612.

In this case, a gas action space is increased by the gap to enlarge a space for temporarily storing a gas introduced into the movement guide hole 612, thereby providing margin time sufficient to apply an upward force.

The sealing part 640 may be formed of an O-ring or a plastic coating part.

In addition, since the piston 630 has a length of no more than 6-8 cm, in order to provide a sufficient stroke to the piston, the straight movement guide hole 612 is required to have a length larger than that of the conventional art.

Figure 9:
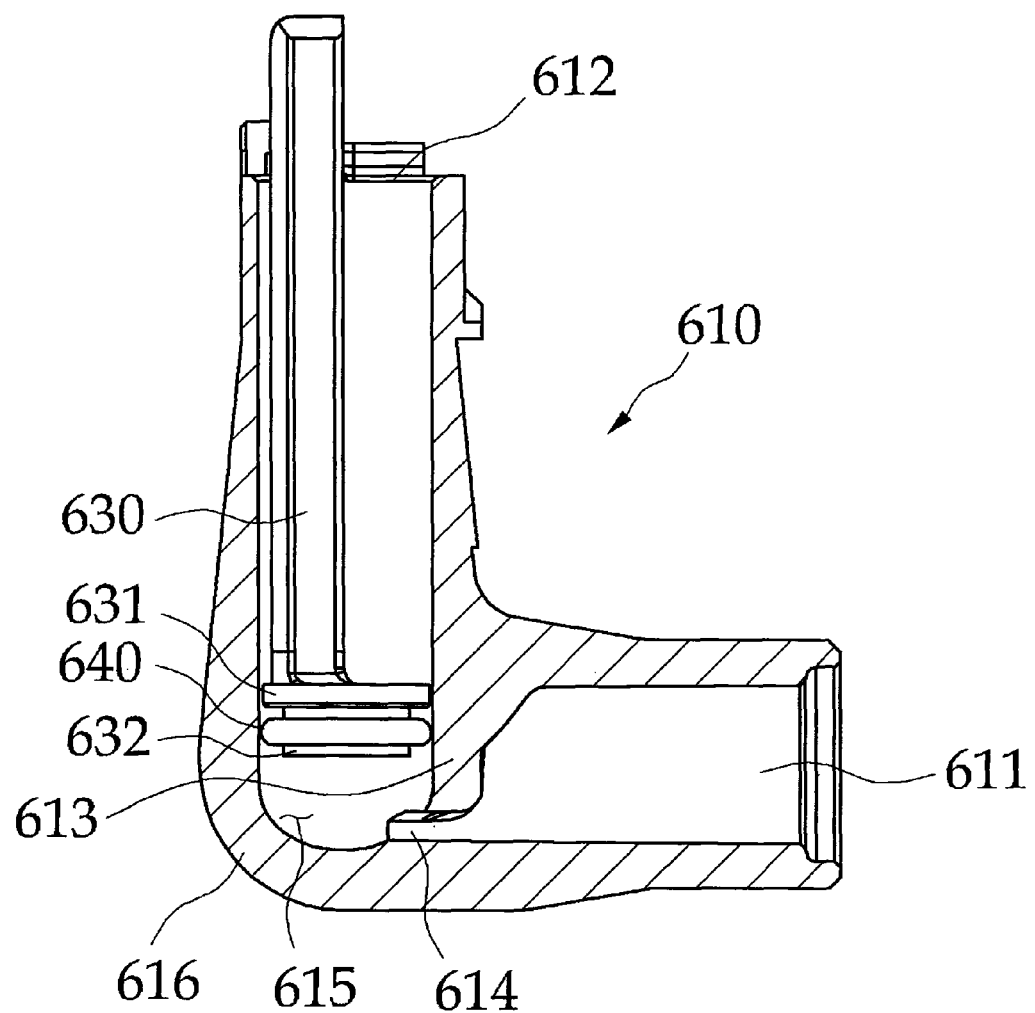
FIG. 9 is a perspective view showing the cylinder and the piston in accordance with an exemplary embodiment of the present invention, which are assembled to each other.

For this purpose, as shown in FIG. 9, the straight movement guide hole 612 is formed to partially and vertically cross the gas supply port 611.

Further, the L-shaped cylinder 610 has a fist thick part 613 disposed at an inner corner to form the straight movement guide hole 612, and an intermediate passage 614 formed between the first thick part 613 and the gas supply port 611. A gas passes through the intermediate passage 614 to press a lower end of the piston head 631 formed at a lower end of the piston 630.

Eventually, since the first thick part 613 causes the straight movement guide hole 612 to be deeper, a stroke of the piston 630 can be increased to sufficiently rotate the gear member 550.

Moreover, the partially spherical rotation space 615 is formed between the lower end of the straight movement guide hole 612 and the gas supply port 611 such that the gas passed through the gas supply port 611 and the intermediate passage 614 can be smoothly introduced into the movement guide hole 612.

A second thick part 616 may be formed around the partially spherical rotation space 615. Therefore, it is possible to prevent the outer corner part of the cylinder 610 from being broken by a high pressure gas.

The second thick part 616 may have a thickness gradually thinned from around the spherical rotation space 615 to both sides of the cylinder 610. Therefore, it is possible to reduce a volume of the cylinder 20 while maintaining its strength.

In the drawings, a structure of a pretensioner 600 including a cylinder 610 in accordance with an exemplary embodiment of the present invention is partially illustrated.

As shown, the pretensioner 600 in accordance with an exemplary embodiment of the present invention includes a torsion bar 250 on which a webbing is wound, a gear member 550 connected to the torsion bar 250, a cylinder 610, a piston 630 moved along the movement guide hole 612 formed at a portion of the cylinder 610, and having a rack 633 formed at a side surface thereof in a longitudinal direction, a cylindrical sealing operation part 632 integrally formed with a bottom of the piston 630 and projecting therefrom; a sealing part 640 coupled to an outer periphery of the sealing operation part 632 to seal between the piston 630 and an inner wall of the cylinder 610; and a hooking means 510 for hooking the piston 630 at an initial hooking position. In the drawings, reference numeral 690 designates an inflator 690 installed at a gas supply port 611 of the cylinder 610.

In the drawings, the sealing part 640 is an O-ring, but the sealing part 640 may be a plastic coating part.

The hooking means 510 is a position fixing piece 511 connected to the gear member 550, formed at a base member 500 through which the torsion bar 250 passes, and having a shape meshed with the rack 633 of the piston 630.

That is, the position fixing piece 511 is formed of a plate that is shaped to form the rack 633. Reinforcement plates vertically extend upward and downward from upper and lower ends of the shaped plate.

Meanwhile, the base member 500 has a guide piece 520 opposite to the position fixing piece 511 with the piston 630 interposed therebetween. As shown, a surface of the guide piece 520 opposite to the piston 630 is parallel to the piston 630.

Moreover, a guide cover 670 is fixedly installed at the cylinder 600 to guide the piston 630. A guide surface parallel to the piston 630 is formed inside the guide cover 670.

As a result, when the vehicle is abruptly decelerated, e.g. due to collision, a gas is supplied into the cylinder 610 to move the piston 630 upward. Therefore, movement of the rack 633 formed at one side of the piston 630 causes rotation of the gear member 550 meshed with the rack 633 in a winding direction of the webbing.

When the gear member 550 is rotated in the winding direction of the webbing, the webbing is rewound on the torsion bar 250 to closely adhere a passenger to a seat.

Here, since a gas pressure is applied to an O-ring 640 when the piston 630 is moved by the gas pressure, the O-ring 640 is pushed by the piston 630 to be held at the sealing operation part 632. Therefore, the O-ring 640 seals between the piston 630 and the inner wall of the cylinder 610 to improve sealing performance between the piston 630 and the cylinder 610.

In addition, an insert groove (not shown) may be installed around the sealing operation part 632 to securely install the O-ring 640 therein.

Further, when an appropriate gap (or a marginal space) is formed between the sealing part and the lower end of the straight movement guide hole 612, a space for temporarily storing a gas introduced into the movement guide hole of the piston is expanded to provide marginal time to sufficiently apply an upward force. Therefore, the gas discharged from the gas supply port 611 causes an increase in the upward force by the gas pressure applied to the piston head 631.

As can be seen from the foregoing, since a rack of a piston is hooked by a hooking means and then assembled, when an appropriate gap (or a marginal space) is formed between a sealing part and a lower end of a straight movement guide hole, it is possible to enlarge a gas action space.

Therefore, it is possible to secure marginal time for providing a sufficient upward force due to a temporary storage space for a gas introduced into the movement guide hole of the piston.

In addition, the conventional step in the movement guide hole can be removed to increase a pressure receiving area, thereby maintaining the sufficient upward force against the piston.

Further, a thick part is formed at an outer corner of a cylinder to maintain durability when a high pressure gas is injected.

While this invention has been described with reference to exemplary embodiments thereof, it will be clear to those of ordinary skill in the art to which the invention pertains that various modifications may be made to the described embodiments without departing from the spirit and scope of the invention as defined in the appended claims and their equivalents.

What is claimed is:

1. A pretensioner for a seat belt retractor of a vehicle, comprising;
    a torsion bar on which a webbing is wound;
    a gear member connected to the torsion bar;
    a base member with which the gear member is meshed and through which the torsion bar passes;
    a cylinder having a movement guide hole formed therein to supply a gas upon rapid deceleration of the vehicle;
    a piston having a rack with a plurality of teeth formed at a side surface thereof in a longitudinal direction configured to be meshed with the gear member and to be moved along the movement guide hole upon supply of a gas from an initial position substantially within the cylinder to a deployed position substantially out of the cylinder, and;
    a cylindrical sealing operation part integrally formed with a bottom of the piston and projecting therefrom; and
    a sealing part coupled to an outer periphery of the sealing operation part to seal between the piston and an inner wall of the cylinder,
    wherein the base member has a hooking means engaging the piston to retain the piston in the initial position relative to the base member prior to movement of the piston and the rack along the guide hole upon the supply of gas into the deployed position, the hooking means having a shape corresponding to the teeth of the rack of the piston and being in meshed engagement therewith.

2. The pretensioner for a seat belt retractor of a vehicle according to claim 1, wherein the sealing part is an O-ring.

3. The pretensioner for a seat belt retractor of a vehicle according to claim 1, wherein the sealing part is a plastic coating part.

4. The pretensioner for a seat belt retractor of a vehicle according to claim 1, wherein the base member has a guide piece disposed at a position opposite to the position fixing piece with the piston interposed therebetween, and has a surface parallel to the piston.

5. The pretensioner for a seat belt retractor of a vehicle according to claim 4, wherein the cylinder has a guide cover fixed thereto to guide the piston.

* * * * *